(No Model.)
E. D. BALDWIN.
Apple Corer and Cutter.
No. 236,477. Patented Jan. 11, 1881.
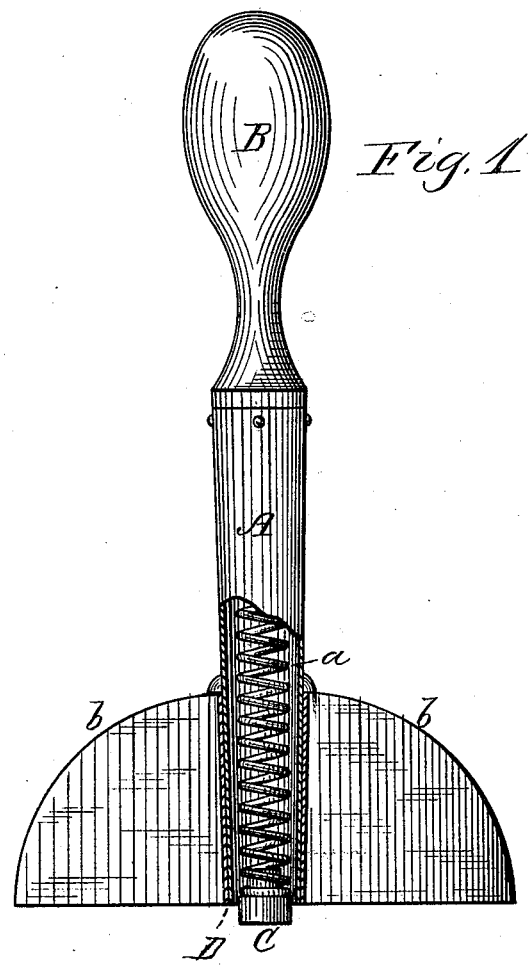
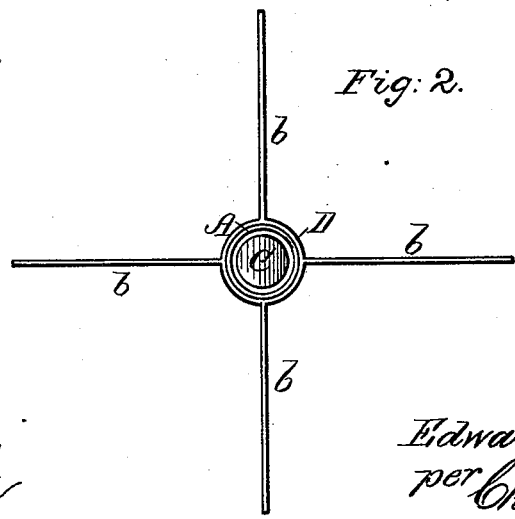
Witnesses
Nat. E. Oliphant,
Geo. R. Porter
Inventor
Edward D. Baldwin
per Chas. H. Fowler,
Attorney.

UNITED STATES PATENT OFFICE.

EDWARD D. BALDWIN, OF BOSTON, MASSACHUSETTS, ASSIGNOR OF ONE-HALF TO JOHN EATON GREER, OF MANCHESTER, NEW HAMPSHIRE.

APPLE CORER AND CUTTER.

SPECIFICATION forming part of Letters Patent No. 236,477, dated January 11, 1881.

Application filed August 31, 1880. (No model.)

*To all whom it may concern:*

Be it known that I, EDWARD DEXTER BALDWIN, a citizen of the United States, residing at Boston, in the county of Suffolk and State of Massachusetts, have invented certain new and useful Improvements in Apple Corers and Slicers; and I do hereby declare that the following is a full, clear, and exact description of the same, reference being had to the annexed drawings, making a part of this specification, and to the letters and figures of reference marked thereon.

The present invention has relation to certain new and useful improvements in devices for taking the cores out of apples or other fruit, and at the same time cutting them into quarters.

The object of the invention is to so construct the device that it will core, quarter, and clean the coring-tube at one and the same operation, and further admit of the device being used simply as a corer, without the quartering attachment, when found desirable. These objects I obtain by the construction shown in the drawings, and hereinafter described.

Figure 1 of the drawings is a side elevation, partly in section. Fig. 2 is an under-side plan view.

In the accompanying drawings, A represents the coring-tube, formed slightly tapering and provided at its upper end with a handle, B. Within the tube A is a plunger, C, connected to a spring, a, the purpose of said plunger being to discharge the core after being cut by the tube, thereby keeping the same clean and insuring its perfect operation. A sleeve, B, slips over the lower end of the tube A, said sleeve having two or more radial blades, b, for cutting the apple or other fruit into halves, quarters, or other sections, as may be required.

When it is desired to simply core the fruit without slicing it the sleeve D, with its blades b, is removed.

Having now fully described my invention, what I claim as new, and desire to secure by Letters Patent, is—

1. An apple-corer provided with means, substantially as described, for discharging the core from the lower end thereof, substantially as and for the purpose set forth.

2. The combination, with an apple corer and slicer, of a device, substantially as specified, for discharging the core from the coring-tube, substantially as and for the purpose described.

3. An apple corer and slicer consisting of the tube A, with blades b, and the plunger C, with spring a, substantially as and for the purpose set forth.

In testimony that I claim the above I have hereunto subscribed my name in the presence of two witnesses.

EDWARD DEXTER BALDWIN.

Witnesses:
JAS. L. CROMBIE,
J. H. PAINE.